United States Patent
Kubota (10) Patent No.: US 7,328,969 B2
(45) Date of Patent: Feb. 12, 2008

(54) PRINT SYSTEM, PRINTER HOST AND PRINT SUPPORT PROGRAM PRODUCT

(75) Inventor: Eiji Kubota, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 475 days.

(21) Appl. No.: 10/959,400

(22) Filed: Oct. 5, 2004

(65) Prior Publication Data

US 2005/0225779 A1    Oct. 13, 2005

(30) Foreign Application Priority Data

Oct. 6, 2003 (JP) ............................. 2003-346964

(51) Int. Cl.
*B41J 2/01* (2006.01)

(52) U.S. Cl. ............................... 347/37; 347/16; 347/5

(58) Field of Classification Search ................. 358/1.2, 358/1.18; 348/207.2; 347/16, 19, 5, 37
See application file for complete search history.

(56) References Cited

U.S. PATENT DOCUMENTS

| | | | | |
|---|---|---|---|---|
| 5,870,114 A | * | 2/1999 | Numata et al. | 347/16 |
| 6,746,101 B2 | * | 6/2004 | Otsuki | 347/37 |
| 2004/0207875 A1 | * | 10/2004 | Endo | 358/1.18 |

* cited by examiner

*Primary Examiner*—Lam Son Nguyen
(74) *Attorney, Agent, or Firm*—Martine Penilla & Gencarella, LLP (57) ABSTRACT

When a four-sided borderless printing is carried out, in order to print a region as it looks on the screen without generating any margins, the print system according to the present invention is directed to a system to carry out the four-sided borderless printing by enlarging the image larger than a print sheet, and the system is provided with an image display means which displays a print target image in a region narrower than an actual region, an image reduction means which reduces the print target image, a print data generation means which generates print data on the basis of the image which is obtained by enlarging the already reduced print target image, and a print execution means which executes printing on the basis of the print data.

3 Claims, 6 Drawing Sheets

REDUCE OVERALL IMAGE

BORDERLESS PRINT
PROGRAM SECTION
- - - - - - - - - - - - - - - - - - - - - - - - - - - - - - -
PRINTER DRIVER       REGION OF
    SECTION          PRINT SHEET      ENLARGED IMAGE

FIG. 5C

ENLARGE THE IMAGE

- - - - - - - - - - - - - - - - - - - - - - - - - - - - - - -
PRINTER

FIG. 5D

PRINT RESULT

NO IMAGE     ENLARGE
MISSING      THE IMAGE

RELATED ART

PRINT RESULT

MARGINS ARE GENERATED

FIG. 6C
IMAGE PROCESSING

PRINT RESULT

REGION OF PRINT SHEET

IMAGE IS ENLARGED

A PART OF IMAGE IS MISSING

PRINT SYSTEM, PRINTER HOST AND PRINT SUPPORT PROGRAM PRODUCT

BACKGROUND OF THE INVENTION

The present invention relates to a print system, and more particularly, it relates to a print system which carries out printing on overall print sheet without any margins, i.e., so called four-sided borderless printing.

Conventionally, when an image and the like captured by a digital camera and the like is printed by a printer, an area (a margin) with no print thereon has been generated on each of the four side portions of the print sheet. In recent years, a technological development has been promoted so as to achieve a printing on the overall surface of the print sheet by eliminating the margin, so called four-sided borderless printing, and such a technology has been commercialized.

Figure 6A:
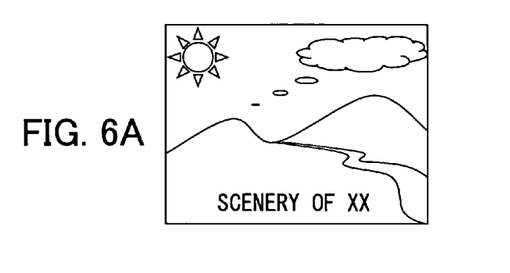
FIG. 6A is a print target image.
Figure 6B:
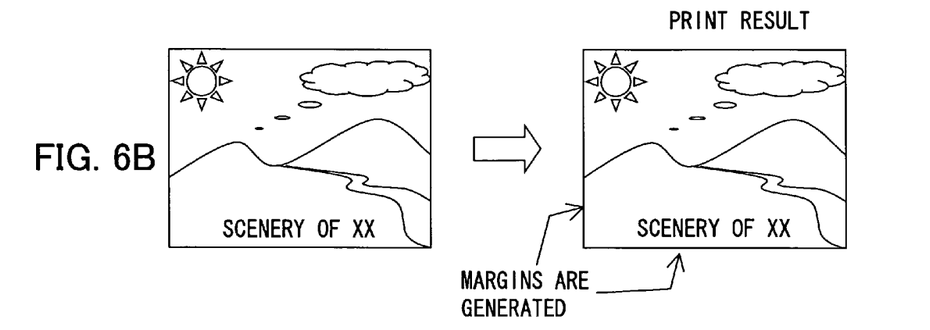
FIG. 6B is a print result when printing is carried out in the same size.
Figure 6C:
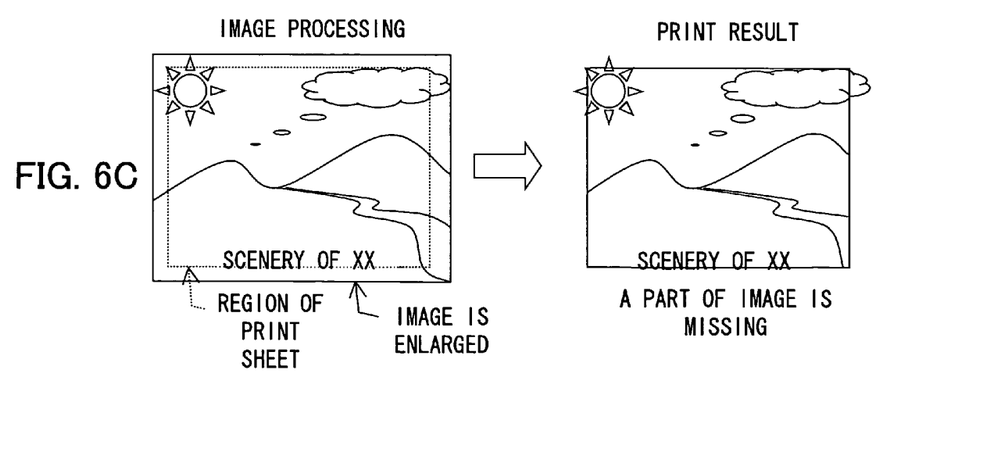
FIG. 6C is a print result when printing is carried out after enlargement.

FIG. 6A to FIG. 6C are illustrations to explain a processing of a printer driver when four-sided borderless printing is carried out. In this example, it is assumed that an image as shown in FIG. 6A is to be printed. It is also assumed that this image is displayed on a screen of a printer host, and the size of the image upon printing agrees with the size of print sheet.

As shown in FIG. 6B, if the image is printed on the print sheet keeping the size of the image as it is, the four-sided borderless printing should be achieved in theory. However, since the size of the image to be printed is identical to the size of the print sheet, there is a possibility that a margin is generated on the side portion if a print position is displaced due to an error in print position or the like. This kind of margin may mix white color of the sheet into the color of background and the like, and this white color becomes conspicuous in the case where the image is a photo and the like.

In order to prevent a generation of this kind of margin, as shown in FIG. 6C, a printer driver executes an image processing to enlarge the image displayed on the screen somewhat larger than the print sheet, and prints thus enlarged image on the print sheet.

In this case also, the four-sided borderless printing can be carried out, and in addition, a margin on the edge portion may not been generated since the enlarged image is printed in such a manner as extending off the print sheet.

SUMMARY OF THE INVENTION

If the four-sided borderless printing is carried out by enlarging the image, there is no margin on the side portions, but the image lies off each side since the image is enlarged more than the print sheet. Therefore, as shown in FIG. 6C, a print result has an image missing the periphery portion, unlike the image displayed on the screen. In other words, even if a borderless printing without any margins is tried to be carried out keeping the image displayed on the screen as shown in FIG. 6A, printing on the print sheet is executed within a range narrower than the image on the screen, resulting that a part of the image is missing as shown in FIG. 6C.

An object of the present invention is directed to a four-sided borderless printing wherein an image region exactly the same one as shown on the screen can be printed without any margins.

In order to solve the problem as described above, a print support program product according to the present invention is directed to a product executed by a computer comprising a print data generation means which generates print data allowing a printer to carry out a four-sided borderless printing on the basis of an image which has been obtained by enlarging a print target image, and the print support program product allowing the computer to execute, an image display processing which displays the print target image within a region narrower than an original region, an image reducing processing which reduces the print target image, and an output processing which outputs thus reduced image to the print data generation means.

Reduction of the image is carried out in advance, thereby preventing missing of the periphery portion of the image, even though the image is enlarged at the time of print data generation. In addition, it is possible to prevent a margin from being generated at the time of borderless printing by holding an image larger in size than the image being displayed.

If the enlargement amount is adjustable by a user, the image reduction processing obtains information regarding the image enlargement from the print data generation means, and it is desirable to calculate a reduction amount as to the print target image based on this information.

Specifically, when the print data generation means enlarges the image, the image reduction processing calculate a reduction amount as to the print target image so that the size of the print target image becomes identical to that of the image before the reduction. This calculation is executed in the same manner when the enlargement amount is a fixed value.

Furthermore, it is desirable that the image display processing displays the image such that as to each side, a difference upon printing between the image region to be displayed and the original image region becomes at least larger than an error in print position amount of the printer.

With this configuration, it is assured that no margins are generated even if there is an error in print position.

If the printing target image is converted into print data without being enlarged, the above problem can be solved by the following print support program product.

In other words, the print support program product is directed to a product comprising a print data generation means which generates print data for allowing a printer to carry out a four-sided borderless printing on the basis of a print target image, and allowing a computer to execute, an image display processing to display the print target image within an area narrower than an original area, and an output processing which outputs the print target image to the print data generation means.

BRIEF DESCRIPTION OF THE DRAWINGS

FIG. 5 shows illustrations to explain an image processing at the time of printing.

FIG. 6 shows illustrations to explain a conventional borderless printing.

DETAILED DESCRIPTION OF THE PREFERRED EMBODIMENTS

Preferred embodiments of the present invention will be explained with reference to the accompanying drawings.

Figure 1:
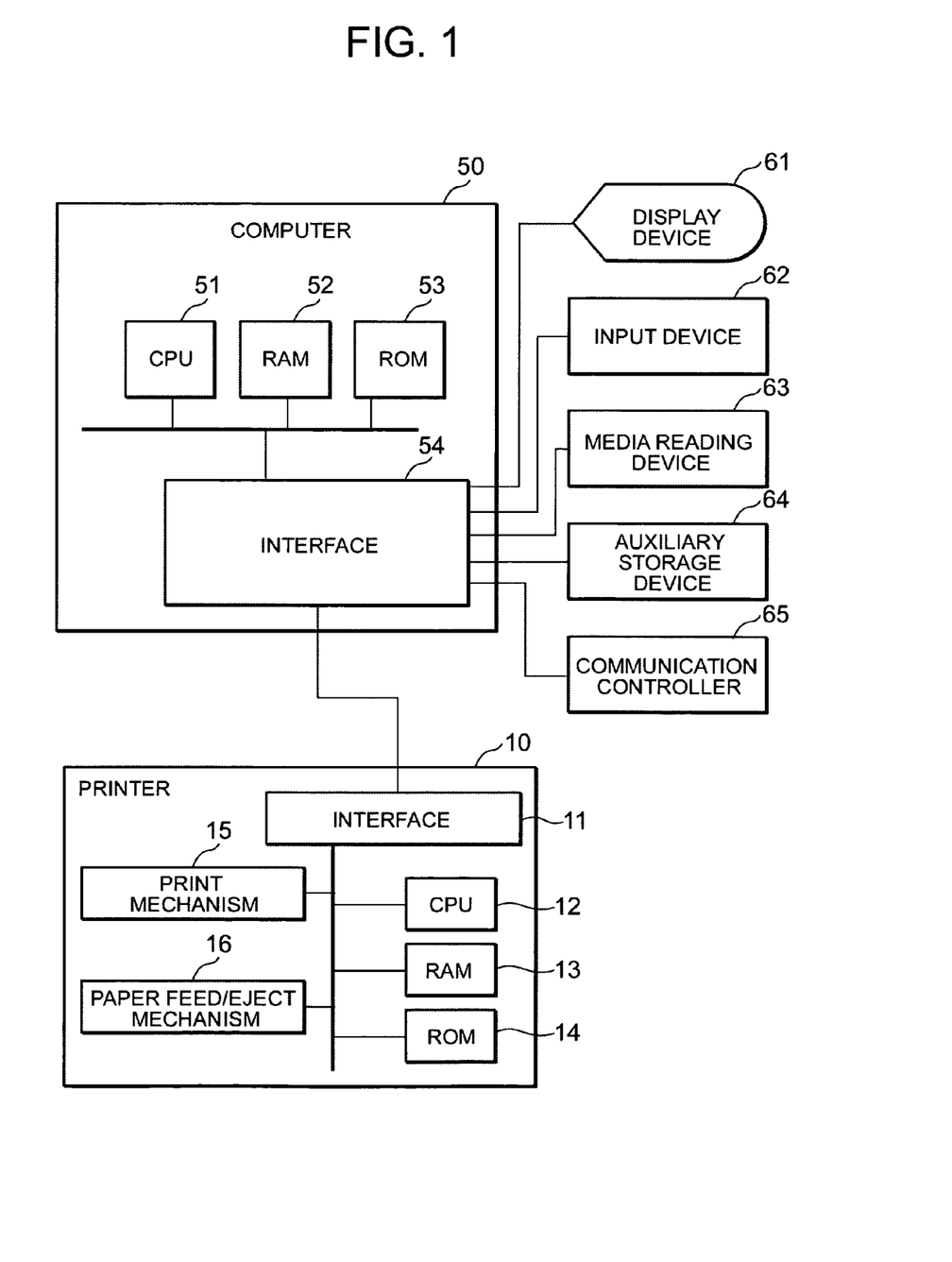
FIG. 1 is a block diagram for schematically explaining a hardware configuration of a print system.

FIG. 1 is a block diagram to explain the hardware configuration of the print system to which the present invention has been applied.

As shown in FIG. 1, the print system comprises a computer 50 to implement various processing according to applications, print processing and the like by a printer driver, and a printer 10 which is connected to the computer 50. In the present embodiment, the computer 50 functions as a printer host which generates print data and transmits the print data to the printer 10. On the other hand, the printer 10 is a print device which carries out printing on the basis of the print data transmitted from the computer 50. The printer 10 is provided with a borderless printing function, which carries out printing the overall surface of a print sheet.

The computer 50 comprises a CPU (Central Processing Unit) 51 which executes processing based on various programs, RAM (Random Access Memory) 52 which temporarily stores data, programs and the like, ROM (Read Only Memory) 53 which previously stores in nonvolatile manner, various data to control the computer 50, start-up programs and the like, and interface 54 which is responsible for data transmitting/receiving with peripheral equipment such as the printer 10 being connected.

In addition, the computer 50 is connected to a display device 61 such as a color display, an input device 62 such as a mouse and a keyboard, a media reading device 63 to read data from a recording medium such as CD-ROM, a built-in or external auxiliary memory 64, and a communication controller 65 to establish connection with the computer network such as the Internet.

The printer 10 is an ink-jet color printer, for example. The ink-jet color printer is provided with a plurality of ink cartridges each having a housing filled with ink, and printing is carried out by spraying the ink from a print head to a print medium, such as print sheet, CD-R and the like.

The printer 10 comprises an interface 11 which is responsible for a communication with the computer 50 such as data receiving therefrom, a CPU 12 which carries out processing based on the print data, various programs and the like, RAM 13 which temporarily stores the print data and the like, ROM 14 which stores in advance various data, various programs and the like in nonvolatile manner to control the printer 10, a print mechanism 15 including a print head which sprays ink, a carriage drive mechanism or the like which drives a carriage on which the print head is mounted, and a paper feed/eject mechanism 16 which carries out feeding and ejecting print sheet and the like.

Next, with reference to the functional block diagram of FIG. 2, functional configurations in the computer 50 and the printer 10 will be explained, which are implemented by the print system as described above.

Figure 2:
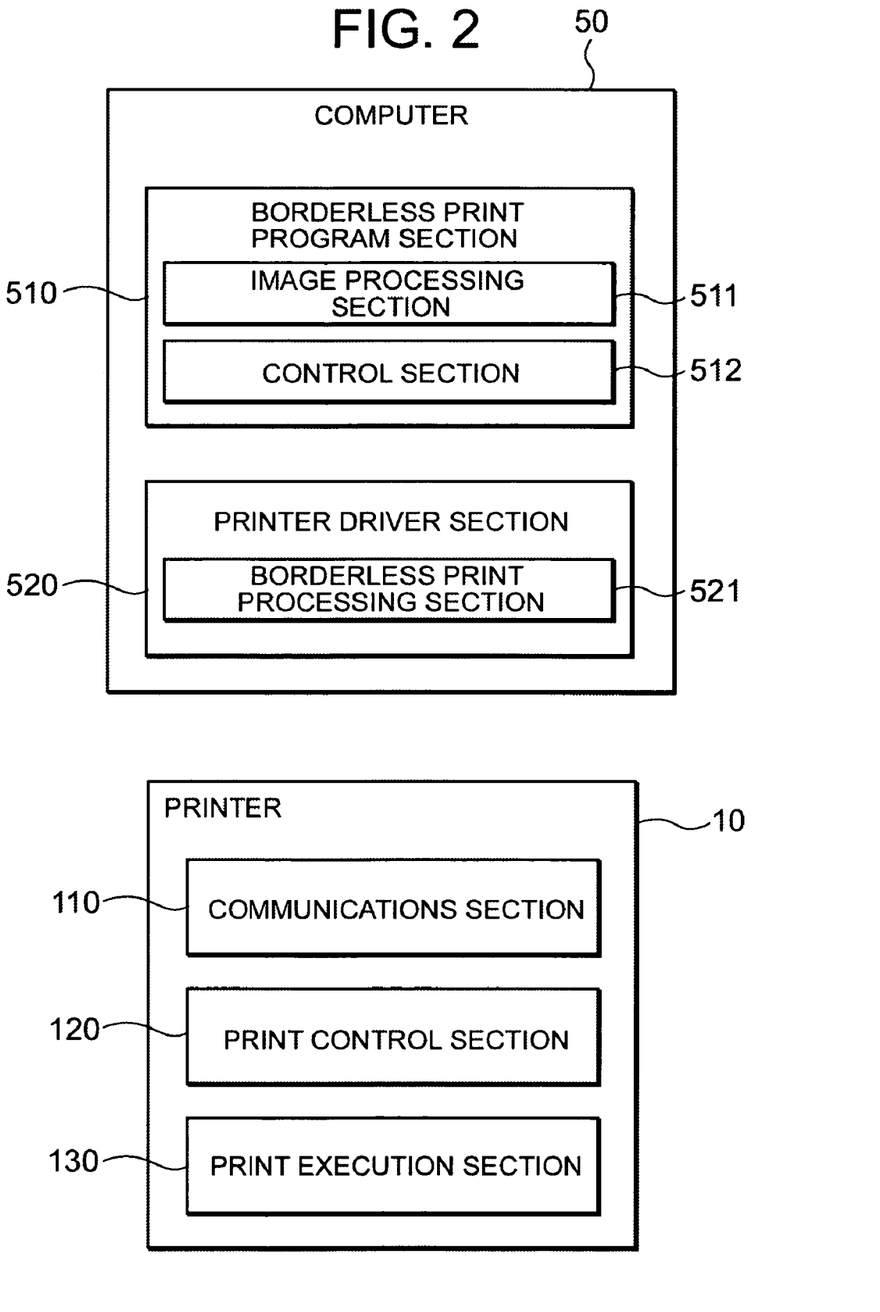
FIG. 2 is a block diagram which shows a functional configuration of the print system.

As shown in FIG. 2, a borderless print program section 510 and a printer driver section 520 are established on the computer 50.

When the borderless printing is carried out by the print system according to the present invention, the borderless print program section 510 generates an image to be printed based on an operation from a user, and gives a direction to carry out the borderless printing to the printer driver section 520.

Therefore, the borderless print program section 510 is provided with an image processing section 511 having an image generation and editing function, a control section 512 which performs a control of each processing, such as borderless print processing, in the borderless print program section 510.

The CPU 51 executes a borderless print application program, which has been loaded on the RAM 52, thereby establishing the borderless print program section 510 on the computer 50.

The printer driver section 520 has functions to input the image data generated by the borderless print program section 510, convert the image data into print data in a format which can be interpreted by the printer 10, and to transmit the print data to the printer 10 via the interface 54. In the conversion process to the print data, specifically, the following processing is carried out, i.e.: rasterizing processing which expands the read-in image data to image data as an aggregation of dots, half-tone processing which performs color conversion processing and half-toning processing as to the image data, and a processing for converting thus processed image data into print data.

The printer driver section 520 is provided with a borderless print processing section 521, and when the borderless printing is carried out, the image data inputted from the borderless print program section 510 is enlarged at a predetermined ratio by image processing. Specifically, by applying the image processing to scale up the resolution and the like, thereby generating print data, with which printing larger than the print sheet can be achieved. If the user does not desire enlargement of the image so much, the enlargement ratio can be reduced according to a direction from the user. It is to be noted here, as the enlargement ratio is reduced, margins on the four sides of the print sheet are more likely to be generated due to an error in print position and the like.

The CPU 51 executes a printer driver program, which has been loaded on the RAM 52, thereby establishing the printer driver section 520 on the computer 50.

The borderless print application program or the printer driver program may be distributed by recording the program on a portable recording medium such as CD-ROM, for example. A media reading device 63 reads out the program on the recording medium and the program can be installed on the computer 50. Alternatively, the program can be installed on the computer 50 via a computer network such as the Internet, for example.

In FIG. 2, a communications section 110, a print control section 120 and print execution section 130 are established on the printer 10.

The communications section 110 carries out information transmitting/receiving to/from the computer 50, for example, receiving of print data, transmitting information regarding the printer main body, and the like.

The print control section 120 interprets the print data transmitted from the computer 50, and performs a control to execute printing on the printer 10 according to the print data. The CPU 12 performs a processing according to the program having been loaded on the RAM 13 and the print data, thereby establishing the print control section 120 on the printer 10.

The print execution section 130 executes printing according to a direction from the print control section 120. The print mechanism 15 and the paper feed/eject mechanism 16 carry out processing respectively, thereby establishing the print execution section 130 on the printer 10.

Next, a processing of the borderless print program section 510 will be explained.

The borderless print program section 510 carries out a processing for generating image data to be printed, and a processing for printing the image data thus generated.

In other words, it is possible for a user to generate and edit the image data to be printed in the print area, by use of the image processing section 511 in the borderless print program section 510. When the image processing section 511 receives from the user an instruction such as image reading-in, image editing and the like, the image processing section 511 displays an edit display appropriate to a purpose of the instruction, and receives a direction regarding the image generation and editing.

Figure 3:
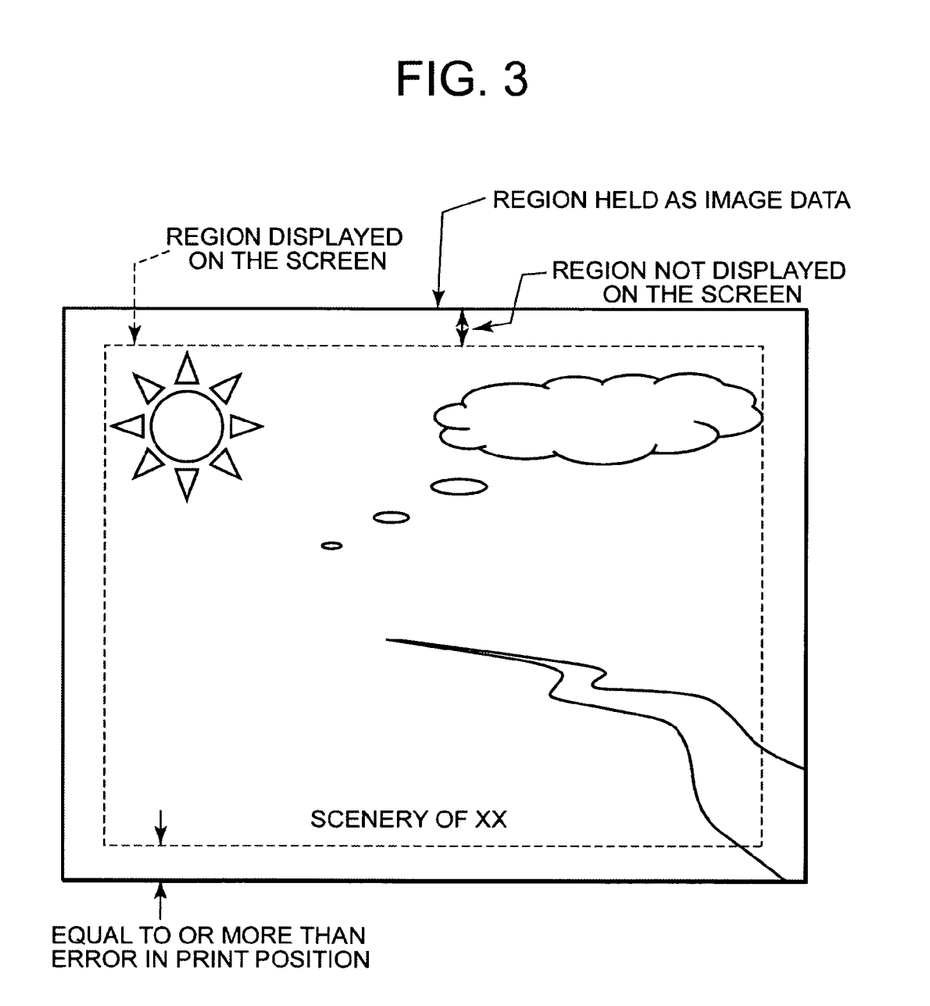
FIG. 3 is an illustration showing an image on an edit display and image data which is being held.

At this stage, as shown in FIG. 3, in the edit display, an area within a range (a region surrounded by a broken line in the Figure) narrower than an actual image data size (a region surrounded by the solid line in the Figure) is displayed. For example, when a photo image is read in, or an image is designated as a background image by a user, or in other similar case, the image is captured as image data having an area with respect to each side being a little larger than the area is trimmed and displayed on the edit display. It is desirable that as to each side, a width of the periphery region as a difference between the image data thus captured and the area being displayed is at least larger than an error in print position in the print system upon printing. With this configuration, at the time of borderless printing, it is possible to prevent that margins are generated in the side portions due to the error in print position of the printer 10.

It is further possible for the user to process the image and to add characters and/or graphics and the like to the image on the edit display which is being displayed, in a similar manner as conventional image generation and/or editing processing. At this stage, it is not necessary for the user to be aware that an image having a region narrower than an actual image is displayed on the edit display.

Figure 4:
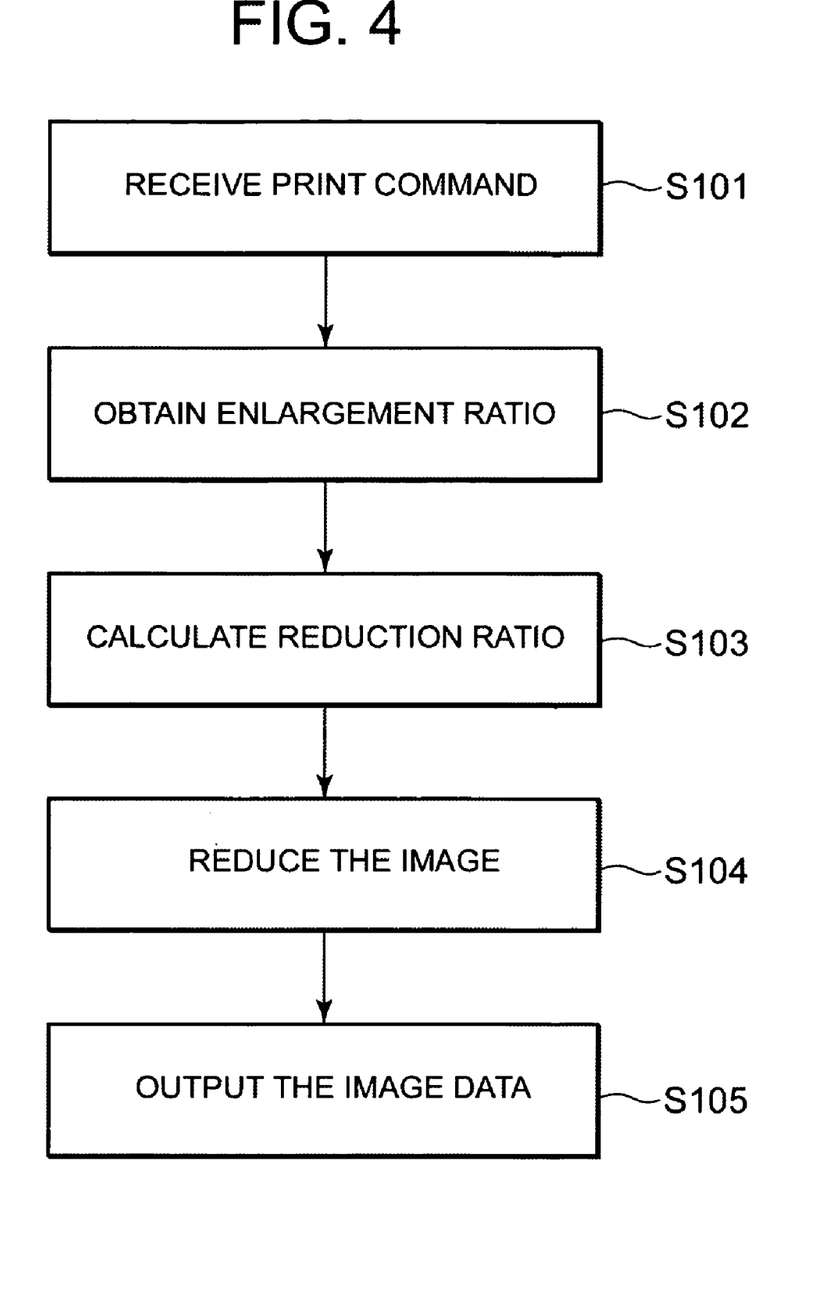
FIG. 4 is a flow diagram showing a processing of a borderless print program section.

Next, with reference to FIG. 4 and FIG. 5, a processing of the borderless print program section 510 at the time of printing thus generated image will be explained.

Figure 5A:
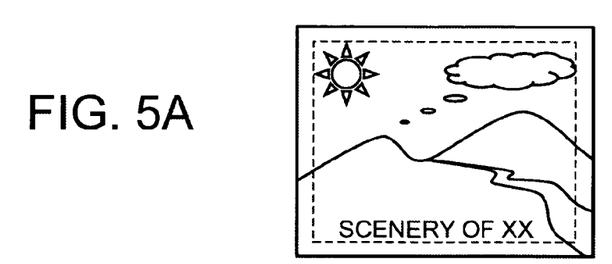
FIG. 5A shows a print target image.

This processing is started when the control section 512 in the borderless print program section 510 receives a print execution command from the user (S101). FIG. 5A shows a print target image of this processing. In FIG. 5A, the frame of solid line indicates a region held as image data, and the frame of broken line indicates a region displayed on the edit display.

The control section 512 inquires the printer driver section 520, and obtains an enlargement ratio of the image for the borderless printing (S102). It is to be noted that the enlargement ratio is a value indicating how much larger the image data is printed than the print sheet, and generally a predetermined value is set. In some cases, a different value may be set by a user. As a value of the enlargement ratio, 0%, i.e., no enlargement, is included.

When the control section 512 obtains the enlargement ratio, a reduction ratio is calculated based on thus obtained enlargement ratio (S103). Here, the reduction ratio is assumed as a value which restores the reduced image to approximately the same size of the original image, when the reduced image is enlarged with the obtained enlargement ratio. In other words, the reduction ratio is assumed to be approximately equal to a value which is obtained by subtracting the inverse of enlargement ratio from 1. For example, if the enlargement ratio is 10% (110% of the original size), the reduction ratio is approximately 9.1% (1-100/110). If the enlargement ratio is set to 0%, the reduction rate is also set to 0%.

If the enlargement ratio in the printer driver section 520 is a fixed value, it is possible to employ a predetermined reduction ratio without inquiring the printer driver section 520.

Figure 5B:
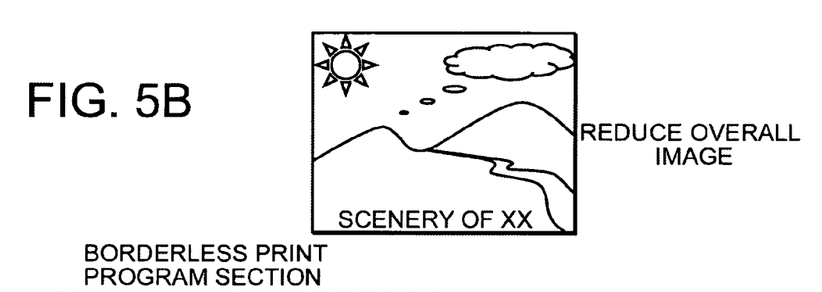
FIG. 5B shows a reduced image.

Furthermore, the control section 512 reduces the image by the image processing according to thus calculated reduction ratio (S104). Specifically, for example, the image is reduced by lowering the resolution according to the reduction ratio. At this stage, as shown in FIG. 5B, the overall image data is reduced, which is held as data, including the region other than the region displayed on the screen.

The control section 512 outputs thus reduced image data to the printer driver section 520, and requests a borderless printing (S105).

Figure 5C:
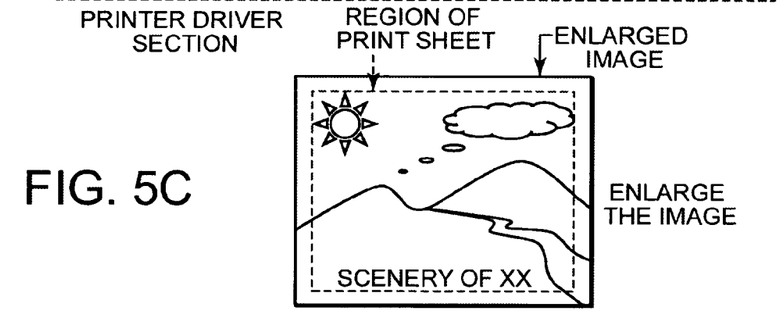
FIG. 5C is an enlarged image.

As shown in FIG. 5C, the borderless print processing section 521 of the printer driver section 520, to which the image data is inputted from the borderless print program section 510, generates print data for printing an image that is enlarged based on the enlargement ratio being set as described above.

Figure 5D:
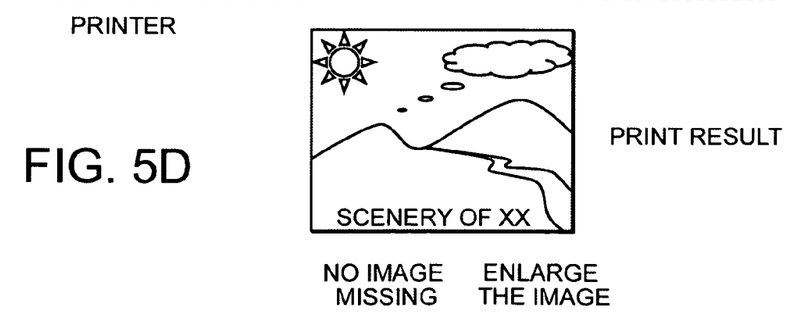
FIG. 5D is a print result.

Subsequently, the printer 10 executes printing on the basis of the print data, and as shown in FIG. 5D, it is possible to obtain a print result which is a four-sided borderless print without any margins and has a region being the same as the image displayed on the screen. In other words, regardless of the existence of background image, for example, even in the case where a text is positioned close to the edge, a complete print result without any missing portions can be obtained, thereby achieving the borderless printing as it looks on the screen.

What is claimed is:

1. A computer readable medium having a printing support program stored thereon, the program comprising a print data generating means for generating print data allowing a printer to carry out four-sided borderless printing on the basis of an image obtained by enlarging a print target image, wherein the program includes instructions for causing the computer to execute:
    an image displaying process to display the print target image smaller than actual image data so that a difference between an area of a displayed image and an area of the image data, occurred when printing, is at least larger than a print error amount caused by the printer with respect to each of the four sides;
    an image editing process to reflect editing done within the displayed, smaller area of the print target image to its image data;
    a calculating process to calculate a reduction ratio corresponding to a fixed enlargement ratio obtained from the print data generating means; and
    an output process to output a reduced image data to the print data generating means.

2. A printing system comprising a print data generating means for generating print data allowing a printer to carry out four-sided borderless printing on the basis of an image obtained by enlarging a print target image, the printing system executing
    an image displaying process to display the print target image smaller than actual image data so that a difference between an area of a displayed image and an area of the image data, occurred when printing, is at least larger than a print error amount caused by the printer with respect to each of the four sides;

an image editing process to reflect editing done within the displayed, smaller area of the print target image to its image data;

a calculating process to calculate a reduction ratio corresponding to a fixed enlargement ratio obtained from the print data generating means; and an output process to output a reduced image data to the print data generating means.

3. A printer host comprising a print data generating means for generating print data allowing a printer to carry out four-sided borderless printing on the basis of an image obtained by enlarging a print target image, the printer host executing an image displaying process to display the print target image smaller than actual image data so that a difference between an area of a displayed image and an area of the image data, occurred when printing, is at least larger than a print error amount caused by the printer with respect to each of the four sides;

an image editing process to reflect editing done within the displayed, smaller area of the print target image to its image data;

a calculating process to calculate a reduction ratio corresponding to a fixed enlargement ratio obtained from the print data generating means; and an output process to output a reduced image data to the print data generating means.

* * * * *